Sept. 10, 1957
F. E. MANCEAU
2,805,759
POTATO ELEVATOR
Filed June 21, 1955
4 Sheets-Sheet 3
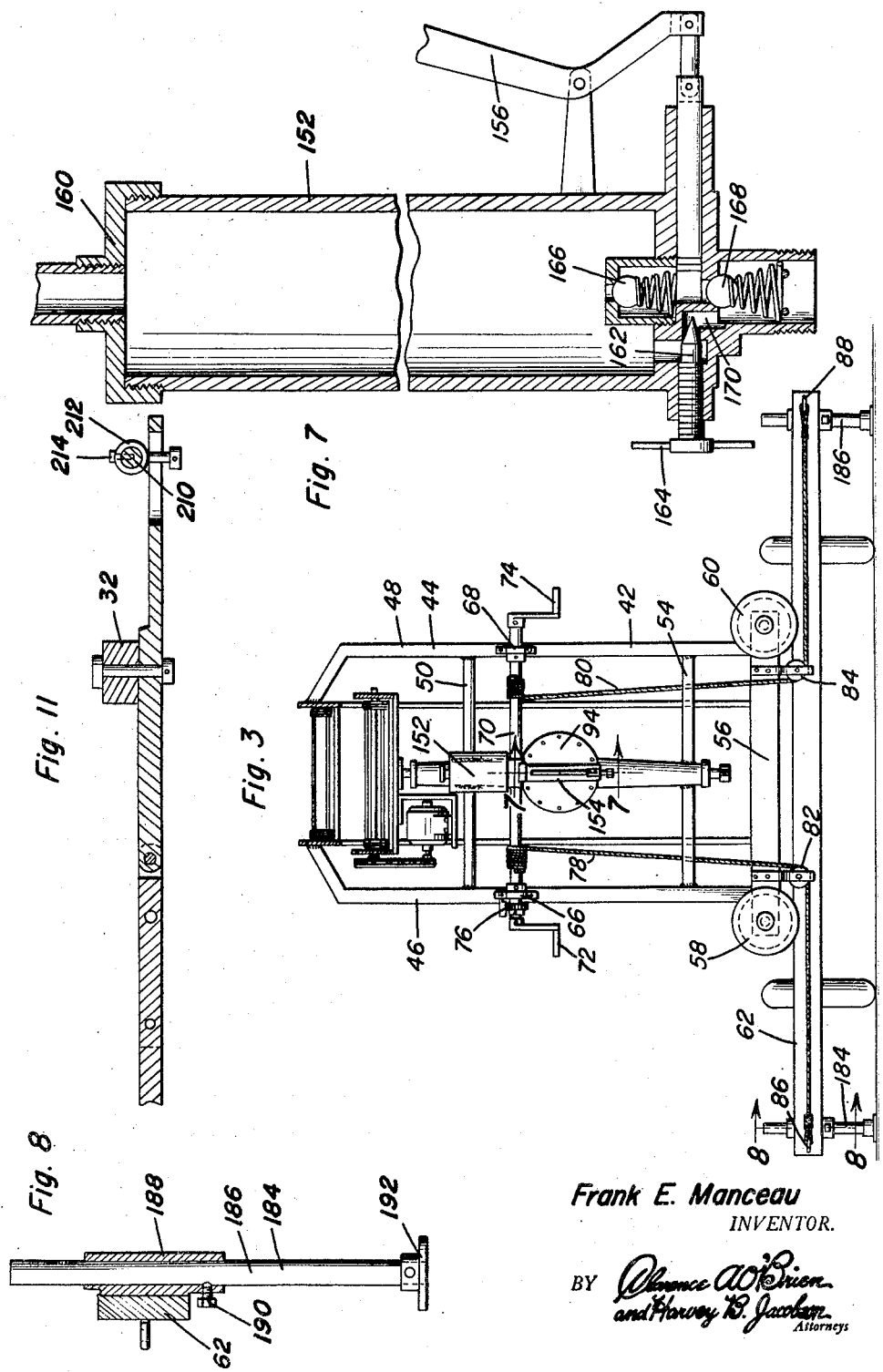
Frank E. Manceau
INVENTOR.

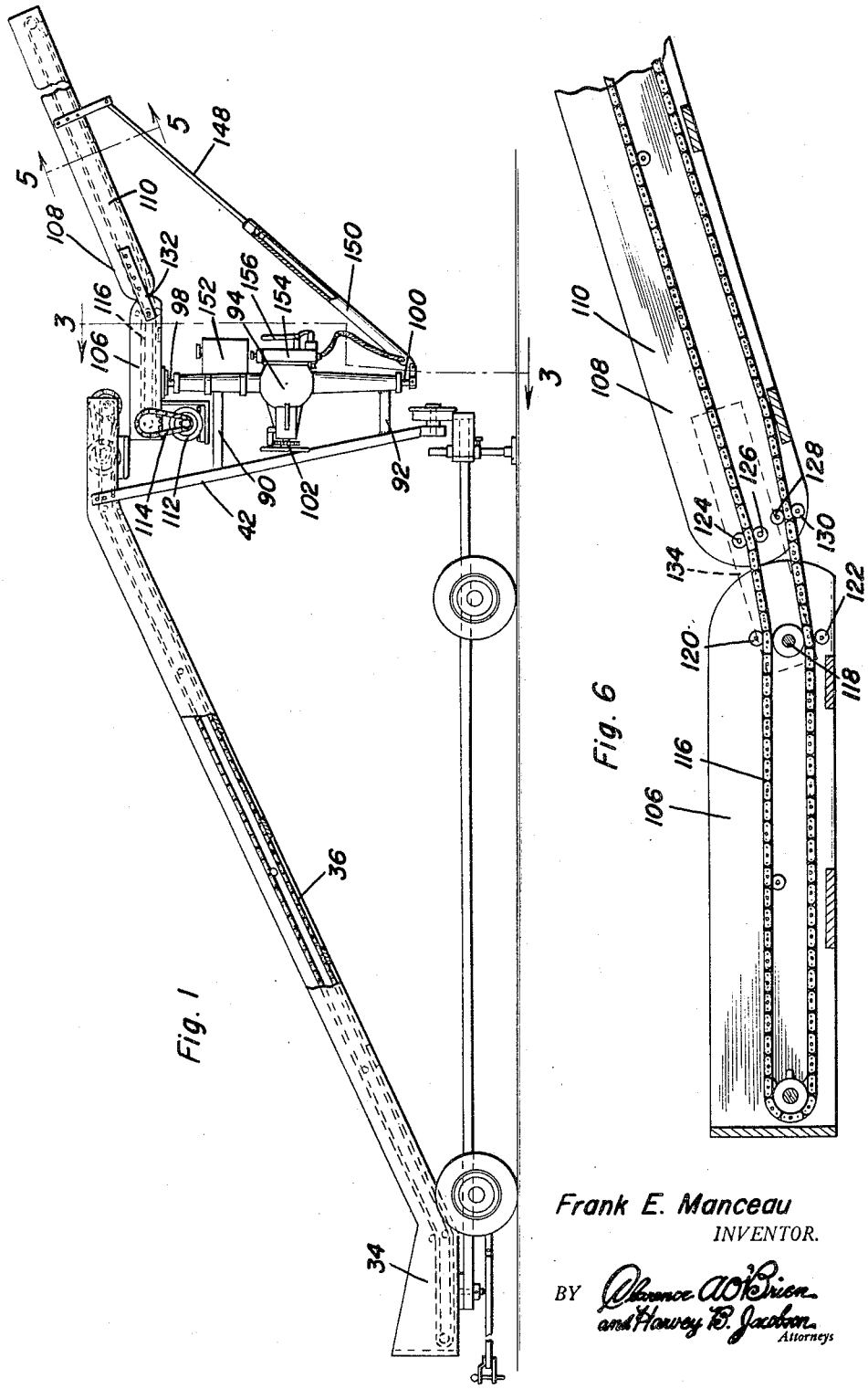

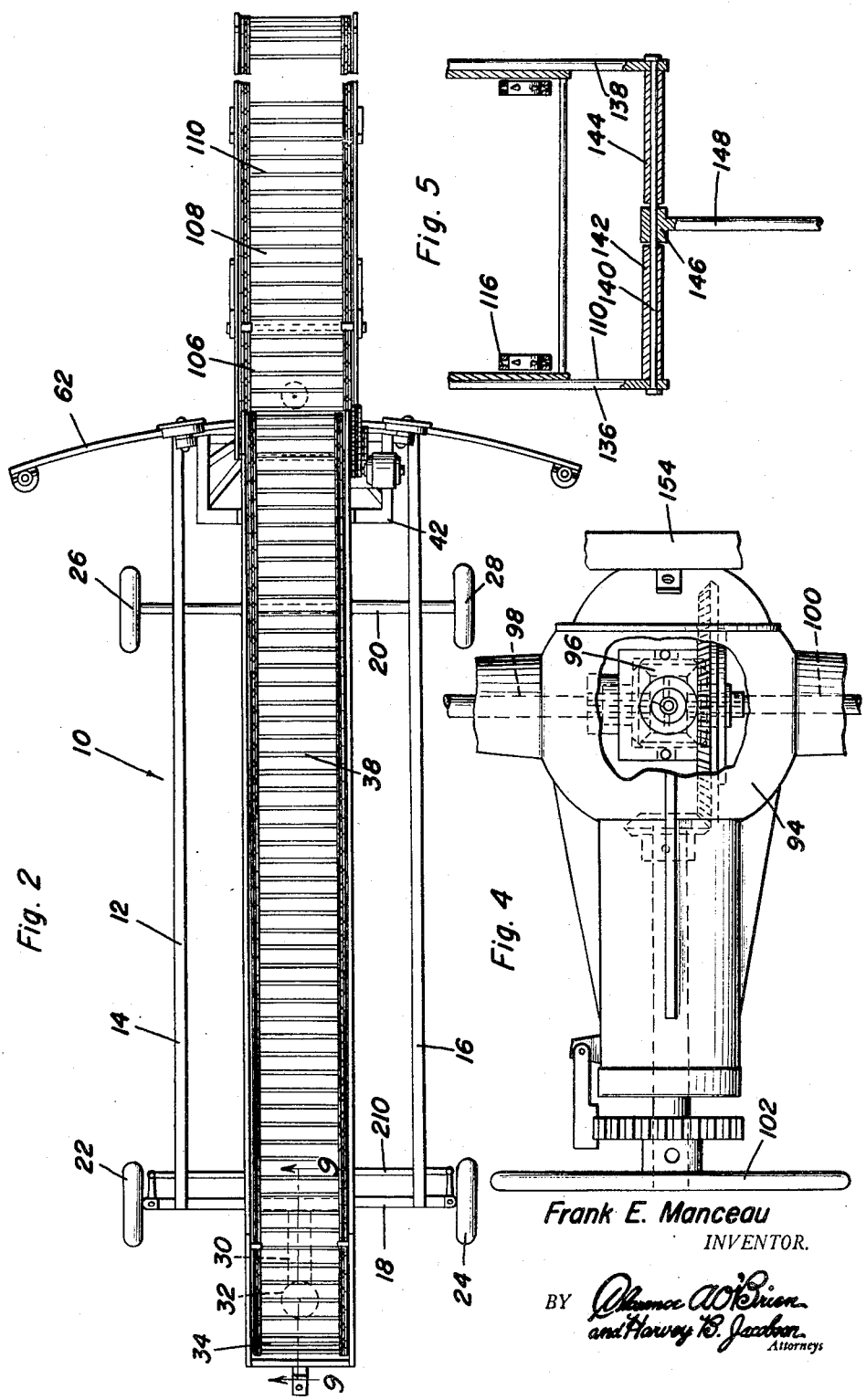

Sept. 10, 1957 F. E. MANCEAU 2,805,759
POTATO ELEVATOR
Filed June 21, 1955 4 Sheets-Sheet 4
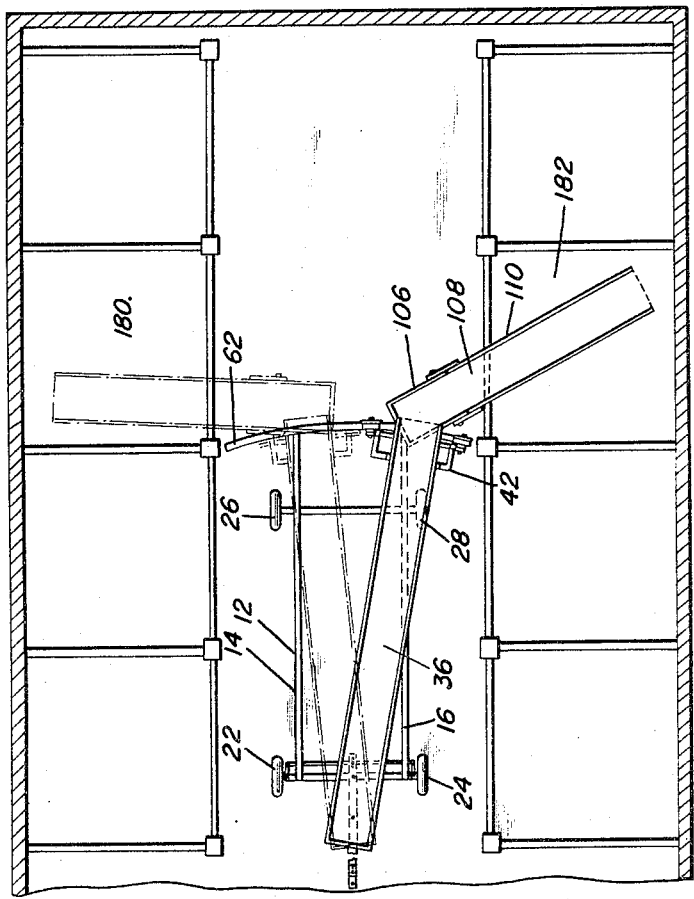
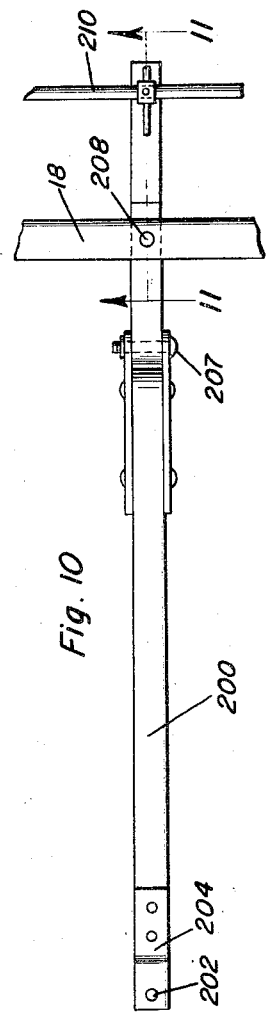
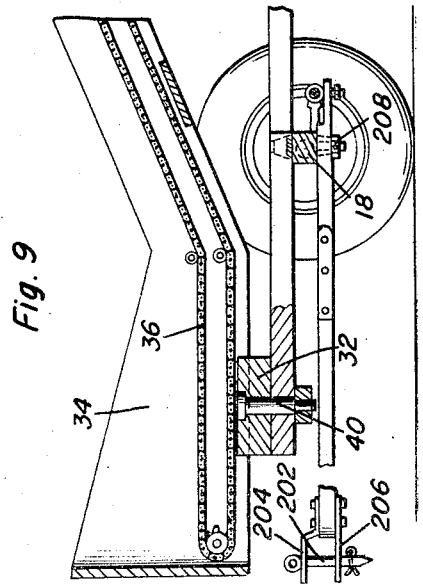
Frank E. Manceau
INVENTOR.

United States Patent Office 2,805,759
Patented Sept. 10, 1957

2,805,759

POTATO ELEVATOR

Frank E. Manceau, Tulelake, Calif.

Application June 21, 1955, Serial No. 516,900

6 Claims. (Cl. 198—90)

This invention relates to the class of agricultural equipment and more particularly to a novel elevator for use in depositing vegetables such as potatoes or the like in bins in a convenient manner.

The primary object of the present invention resides in the provision of a potato elevator so constructed as to have a segmental conveyor capable of jackknifing upon itself so that it may be swung from side to side to deposit potatoes in various bins in a convenient and highly efficient manner.

A further object of the invention lies in the provision of a novel arrangement of parts wherein a segmental conveyor is utilized with a main elevator conveyor in such a manner that potatoes and like vegetables may be raised in a highly efficient manner and deposited in various bins without necessitating movement of a chassis on which the potato elevator is mounted.

Still further objects and features of this invention reside in the provision of a potato elevator designed to fill bins and driveways of potato cellars with a minimum of time and effort and a maximum of coverage of space at each setting, which potato elevator is simple in construction, and highly efficient in operation while being relatively inexpensive to manufacture thereby permitting wide use in the industry.

The construction of this invention features the use of a novel arcuate track mounted on a chassis on which a carriage is mounted. The main conveyor elevator is pivoted to the chassis at its lower end, and the other and upper end is carried by the carriage and associated with the carriage is a segmental conveyor adapted to be aligned with the main elevator conveyor and having ,ne segment thereof capable of being rotated while the ,ther segment is capable of being elevated in addition to being rotated.

These, together with the various ancillary objects and features of the invention which will become apparent as the following description proceeds, are attained by this potato elevator, a preferred embodiment of which has been illustrated by the accompanying drawings, by way of example only, wherein:

Figure 1 is a side elevational view of the potato elevator comprising the present invention;

Figure 2 is a top plan view of the potato elevator;

Figure 3 is a front elevational view of the invention and illustrating in particular the winch means for use in moving the carriage along the track;

Figure 4 is a detailed view with parts being broken away of the shaft assembly utilized in rotating the entire segmental conveyor;

Figure 5 is an enlarged sectional detail view as taken along the plane of line 5—5 in Figure 1 and illustrating the construction of one of the sections of the segmental conveyor and the associated piston of the hydraulic means utilized in elevating the section of the segmental conveyor;

Figure 6 is an enlarged sectional detail view of the segmental conveyor;

Figure 7 is a sectional view in an enlarged scale as taken along the plane of line 7—7 in Figure 3 and illustrating in particular the construction of the valve means for operating the hydraulic means for elevating one of the sections of the segmental conveyor;

Figure 8 is an enlarged sectional detail view as taken along the plane of line 8—8 in Figure 3 and illustrating the construction of the track means utilized for giving the carriage and chassis stability;

Figure 9 is a sectional detail view of the pivotal mounting for the main elevator conveyor;

Figure 10 is a plan view of the drawbar capable of being utilized in transporting the elevator;

Figure 11 is a sectional detail view as taken along the plane of line 11—11 in Figure 10; and Figure 12 is a schematic diagram illustrating the manner in which the potato elevator can be utilized to fill various bins or the like.

With continuing reference to the accompanying drawings wherein like reference numerals designate similar parts throughout the various views, and with particular attention initially directed to Figures 1 and 2, it will be seen that herein there is disclosed the potato elevator 10 which includes a wheeled chassis including outer frame members 14 and 16 having axles 18 and 20 on which there are mounted wheels 22, 24, 26, and 28. The chassis 12 also includes a rearwardly extending portion 30 to which there is pivotally mounted as at 32 the lower end 34 of an elevator conveyor 36 comprising an endless link arrangement driven by a motor 38 in any convenient manner. As can be best seen in Figure 9, the end 34 of the conveyor is mounted by means of a bolt or shaft 40 so as to permit the swinging of the main elevator conveyor 36 from side to side to a limited degree.

The upper end of the conveyor 36 is attached to a carriage 42 which as can be best seen in Figure 3 comprises an upwardly extending yoke 44 including side portions 46 and 48 interconnected by crossbars 50 and 54 as well as by a lower crossbar 56 on which wheels 58 and 60 are rotatably mounted, the wheels 58 and 60 engaging an arcuate track 62 rigidly mounted on the frame or members 14 and 16 of the chassis 12.

Journaled in bearings 66 and 68 mounted on the side portions 46 and 48 of the yoke 44 is a winch 70 operated by means of cranks 72 and 74 and provided with a ratchet and pawl assembly 76 for holding the winch 70 in a selected position and in turn holding the carriage in a selected position along the arcuate track. Cables 78 and 80 have one end of each thereof wrapped about the winch 70 while the other ends of the cables 78 and 80 are entrained about pulleys 82 and 84 depending from the carriage 42 and are attached as at 86 and 88 to the arcuate track 62 adjacent the ends thereof. Hence by operation of the winch 70 the carriage 42 may be moved from side to side along the track thus shifting the main elevator conveyor 36 from side to side.

Carried by the carriage 42 by means of braces 90 and 92 is a shaft assembly 94 comprising a conventional automobile differential which as can be seen best in Figure 4 has a spider gear assembly 96 frozen so as to cause both axles 98 and 100 of the differential assembly to rotate simultaneously. An operating wheel 102 is provided for rotating the spider gear assembly 96 so that the axles 98 and 100 may be rotated simultaneously.

Carried by the axle 98 and rotating therewith is a conveyor section 106 of a segmental conveyor 108 which also includes the conveyor section 110. A motor 112 is provided for operating the conveyor of the conveyor sections 106 and 110 and these conveyor sections may be operated by the motor 112 through a sprocket gear and chain arrangement 114 so as to cause the endless link assembly 116 to move as desired. Sets of rollers 118, 120, 122 and 124, 126 and 128, 130 are provided for the respective conveyor sections 106 and 110 of the segmental conveyor 108 to thereby insure proper operation and the guiding arrangement of the link conveyor 116. The conveyor sections 106 and 110 are hinged together by means of adjustable hinge plates 132 and 134. It is to be recognized that rotation of the wheel 102 will cause rotation of the axle 98 thereby causing rotation in a horizontal plane of the segmental conveyor 108 because of the rotation of the conveyor section 106.

As can be seen best in Figure 5, the conveyor section 110 has a pair of downwardly extending brackets 136 and 138 which have a shaft 140 extending therebetween. A pair of spacers 142 and 144 are mounted on the shaft and maintain in position the end 146 of a piston rod 148 which is rotatably mounted on the shaft 140. The piston rod 148 is adapted to move inwardly and outwardly of a cylinder 150 which is mounted on the axle 100 and which rotates with the axle 100. A fluid reservoir 152 is carried by the carriage 42 and a pump 154 operated by a handle 156 is provided for actuating the piston rod 148 within the cylinder 150. This pump assembly can be best seen in Figure 7. The tank 152 may be provided with a suitable cover 160 and there is provided a valve assembly 162 for delivering fluid to the cylinder 150 depending upon adjustment of the valve assembly 162 by means of a handle 164. A pair of ball valve members 166 and 168 are provided for controlling the flow of fluid depending upon the setting of the valve member 162 and there is provided a return oil port 170. Hence, upon operation of the crank 156 with the valve in the position as is shown in Figure 7, oil will be drawn from the reservoir 152 and forced down into the cylinder 150 to extend the piston rod 148. With the valve 164 withdrawn so as to open the return port 170, oil will be forced upwardly and back into the reservoir 152.

The operation of the piston rod 148 will therefore cause the raising and lowering in a vertical plane of the conveyor section 110 of the segmental conveyor.

As can be seen best in Figure 12, the operation of the axle 98 through the operation of the wheel 102 will enable the segmental conveyor 108 to jackknife upon itself so as to enable bins 180 or bins 182 on either side of the conveyor to be filled in a convenient manner independent of the height of the bins due to the fact that the segmental elevator can be raised and lowered using the piston rod 148. In order to hold the chassis 12 stable there are provided jacks 184 and 186 on each end of the tracks 62 and since these jacks are generally of the same construction, reference need be had only to Figure 8 to ascertain the construction thereof. These jacks include vertically extending jack standards which are locked in place within mounting brackets 188 carried by the track 62 by means of setscrews 190. Footings 192 may be provided for the standards 184.

In Figures 10 and 11 there is shown the construction of the drawbar for the potato elevator which is indicated by reference numeral 200 and which includes a conventional pin 202 extended between the bifurcations 204 and 206 of the drawbar which is pivotally connected to the axle 18 of the chassis assembly by means of a bolt 208 or the like. The drawbar may be in sections which are hinged as at 207. A steering bar 210 may be provided to which the drawbar may be attached in the conventional manner.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the appended claims.

What is claimed as new is as follows:

1. A vegetable elevator comprising a wheeled chassis, an arcuate track secured on said chassis, a main conveyor hingedly secured at one end to said chassis, a carriage movable on said track and carrying said main conveyor section, a segmental conveyor arrangement including a first conveyor section rotatably mounted on said carriage adjacent to and underlying said main conveyor section to enable said segmental conveyor to be jackknifed with respect to said main conveyor section, and a second conveyor section pivoted to said first conveyor section for movement in a vertical plane.

2. A vegetable elevator comprising a wheeled chassis, an arcuate track secured on said chassis, a main conveyor hingedly secured at one end to said chassis, a carriage movable on said track and carrying said main conveyor section, a segmental conveyor arrangement including a first conveyor section rotatably mounted on said carriage adjacent to and underlying said main conveyor section to enable said segmental conveyor to be jackknifed with respect to said main conveyor section, and a second conveyor section pivoted to said first conveyor section for movement in a vertical plane, said carriage including a shaft assembly for rotating said first conveyor section.

3. A vegetable elevator comprising a wheeled chassis, an arcuate track secured on said chassis, a main conveyor hingedly secured at one end to said chassis, a carriage movable on said track and carrying said main conveyor section, a segmental conveyor arrangement including a first conveyor section rotatably mounted on said carriage adjacent to and underlying said main conveyor section to enable said segmental conveyor to be jackknifed with respect to said main conveyor section, and a second conveyor section pivoted to said first conveyor section for movement in a vertical plane, said carriage including a shaft assembly for rotating said first conveyor section, hydraulic means for pivoting said second conveyor section, said hydraulic means being connected to said shaft assembly.

4. A vegetable elevator comprising a wheeled chassis, an arcuate track secured on said chassis, a main conveyor hingedly secured at one end to said chassis, a carriage movable on said track and carrying said main conveyor section, a segmental conveyor arrangement including a first conveyor section rotatably mounted on said carriage adjacent to and underlying said main conveyor section to enable said segmental conveyor to be jackknifed with respect to said main conveyor section, and a second conveyor section pivoted to said first conveyor section for movement in a vertical plane, and means for moving said carriage along said track.

5. A vegetable elevator comprising a wheeled chassis, an arcuate track secured on said chassis, a main conveyor hingedly secured at one end to said chassis, a carriage movable on said track and carrying said main conveyor section, a segmental conveyor arrangement including a first conveyor section rotatably mounted on said carriage adjacent to and underlying said main conveyor section to enable said segmental conveyor to be jackknifed with respect to said main conveyor section, and a second conveyor section pivoted to said first conveyor section for movement in a vertical plane, said carriage including a shaft assembly for rotating said first conveyor section, and means for moving said carriage along said track.

6. A vegetable elevator comprising a wheeled chassis, an arcuate track secured on said chassis, a main conveyor hingedly secured at one end to said chassis, a carriage movable on said track and carrying said main conveyor section, a segmental conveyor arrangement including a first conveyor section rotatably mounted on said carriage adjacent to and underlying said main conveyor section to enable said segmental conveyor to be jackknifed with respect to said main conveyor section, and a second conveyor section pivoted to said first conveyor section for movement in a vertical plane, said carriage including a shaft assembly for rotating said first conveyor section, hydraulic means for pivoting said second conveyor section, said hydraulic means being connected to said shaft assembly, and means for moving said carriage along said track.

References Cited in the file of this patent

UNITED STATES PATENTS

| 825,292 | Bergert | July 10, 1906 |
| 897,134 | Parker | Aug. 25, 1908 |
| 1,044,547 | Liggett | Nov. 19, 1912 |
| 1,498,991 | Blenko | June 24, 1924 |
| 1,837,580 | Paris et al. | Dec. 22, 1931 |
| 2,501,332 | Heer | Mar. 31, 1950 |
| 2,757,782 | Davis | Aug. 7, 1956 |

FOREIGN PATENTS

| 77,985 | Denmark | Aug. 2, 1954 |